(12) United States Patent
Rossano et al.

(10) Patent No.: US 10,737,396 B2
(45) Date of Patent: Aug. 11, 2020

(54) METHOD AND APPARATUS FOR ROBOT PATH TEACHING

(71) Applicant: ABB Schweiz AG, Baden (CH)

(72) Inventors: Gregory F. Rossano, Enfield, CT (US); Remus Boca, Simsbury, CT (US); Srinivas Nidamarthi, Troy, MI (US); Thomas A. Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 289 days.

(21) Appl. No.: 15/926,513

(22) Filed: Mar. 20, 2018

(65) Prior Publication Data

US 2018/0361593 A1    Dec. 20, 2018

Related U.S. Application Data

(63) Continuation of application No. 15/099,895, filed on Apr. 15, 2016, now Pat. No. 9,919,421.

(60) Provisional application No. 62/147,638, filed on Apr. 15, 2015, provisional application No. 62/147,645, filed on Apr. 15, 2015.

(51) Int. Cl.
| | |
|---|---|
| *B25J 13/02* | (2006.01) |
| *B25J 11/00* | (2006.01) |
| *B25J 9/00* | (2006.01) |
| *B25J 9/16* | (2006.01) |
| *G05B 19/423* | (2006.01) |

(52) U.S. Cl.
CPC ........... *B25J 13/025* (2013.01); *B25J 9/0081* (2013.01); *B25J 9/1656* (2013.01); *B25J 11/005* (2013.01); *B25J 11/0065* (2013.01); *G05B 19/423* (2013.01); *G05B 2219/35444* (2013.01); *G05B 2219/36453* (2013.01); *G05B 2219/45059* (2013.01); *G05B 2219/45062* (2013.01); *G05B 2219/45094* (2013.01); *G05B 2219/45135* (2013.01)

(58) Field of Classification Search
None
See application file for complete search history.

(56) References Cited

U.S. PATENT DOCUMENTS

| | | | | |
|---|---|---|---|---|
| 4,954,762 A | * | 9/1990 | Miyake | G05B 19/4182 219/124.34 |
| 4,979,121 A | * | 12/1990 | Inoue | B23B 3/06 700/194 |
| 5,086,400 A | * | 2/1992 | Hayati | B25J 9/1689 700/260 |
| 6,646,404 B2 | * | 11/2003 | Okuyama | B25J 9/1669 318/568.13 |

(Continued)

*Primary Examiner* — Bhavesh V Amin
(74) *Attorney, Agent, or Firm* — J. Bruce Schelkopf; Taft Stettinius & Hollister LLP (57) ABSTRACT

A dummy tool is used to teach a robot the path the robot will follow to perform work on a workpiece to eliminate the possibility of damaging an actual tool during the training. The dummy tool provides the robot programmer an indication of potential collisions between the tool and the workpiece and other objects in the work cell when path is being taught. The dummy tool can have a detachable input/output device with a graphic user interface (GUI) that can communicate wirelessly with the robot controller. The dummy tool can also have a moveable camera attached thereto to track the relationship of the tool to objects in the work area.

28 Claims, 7 Drawing Sheets

(56) References Cited

U.S. PATENT DOCUMENTS

| | | | |
|---|---|---|---|
| 6,822,412 B1* | 11/2004 | Gan | B25J 9/1692 |
| | | | 318/568.11 |
| 7,627,394 B2* | 12/2009 | Volcic | B25J 9/1664 |
| | | | 318/567 |
| 8,332,067 B2* | 12/2012 | Ditscher | B25J 9/1671 |
| | | | 700/245 |
| 9,149,929 B2* | 10/2015 | Motzer | B25J 9/162 |
| 9,248,573 B2* | 2/2016 | Soe-Knudsen | B25J 9/1682 |
| 9,672,184 B1* | 6/2017 | Jain | G06F 13/409 |
| 9,782,896 B2* | 10/2017 | Terada | B25J 9/1656 |
| 9,919,421 B2* | 3/2018 | Rossano | B25J 11/005 |
| 10,099,376 B2* | 10/2018 | Foerster | B25J 9/1692 |
| 2016/0303737 A1* | 10/2016 | Rossano | B25J 11/005 |
| 2018/0250086 A1* | 9/2018 | Grubbs | A61B 34/37 |
| 2018/0345495 A1* | 12/2018 | Aldridge | B25J 9/0081 |
| 2019/0231436 A1* | 8/2019 | Panse | A61B 34/20 |

* cited by examiner

METHOD AND APPARATUS FOR ROBOT PATH TEACHING

CROSS REFERENCE TO RELATED APPLICATIONS

This application claims the benefit of U.S. Provisional Application No. 62/147,638, filed Apr. 15, 2015 and U.S. Provisional Application No. 62/147,645, filed Apr. 15, 2015, which are incorporated herein by reference in their entirety.

TECHNICAL FIELD

The present application generally relates to teaching industrial robots to follow a path so that the robot can perform work on a workpiece and more particularly, but not exclusively, to using dummy tools, 3D vision and bare hands to train the robot.

BACKGROUND

An industrial robot can be automatically controlled, a multipurpose manipulator, and programmable in three or more axes. Industrial robots can be located at a fixed position, independently mobile, or mounted on a device such as a motorized vehicle or a movable track or gantry. Hardware devices such as a teach pendant can be used by an operator to "jog" an industrial robot. "Jogging" teaches the robot points on a path that the robot follows as the robot performs "work" on a workpiece. "Work" can be defined by actions performed by a robot such as painting, grinding, polishing, deburring, welding etc. that make a physical change to the workpiece and/or other interactions that a robot has with a workpiece, such as picking up and moving the workpiece from one location to another. Some existing systems have various shortcomings relative to certain applications. Accordingly, there remains a need for further contributions in this area of technology.

SUMMARY

One embodiment of the present invention is a unique system for programming a robot path. Other embodiments include apparatuses, systems, devices, hardware, methods, and combinations for teaching a robot to follow a desired path and perform work on a workpiece. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
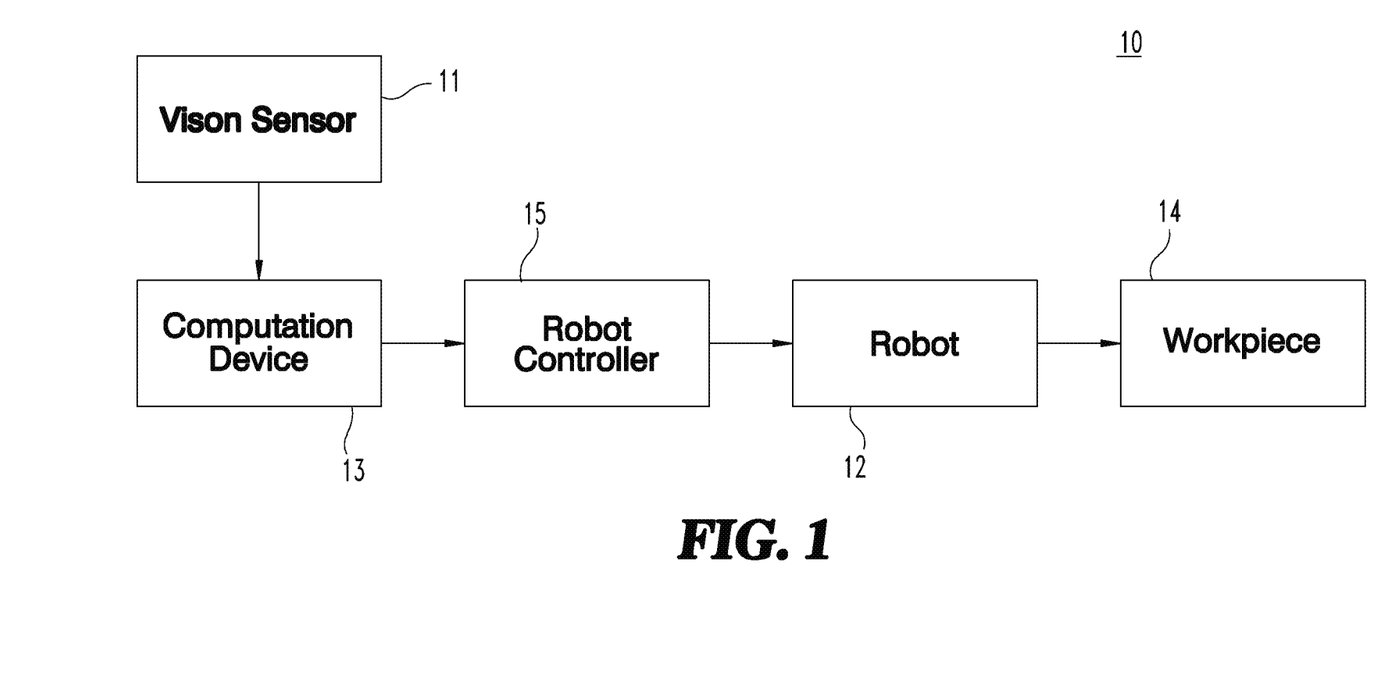
FIG. 1 is a block diagram for a robot system that is used to perform work on a workpiece according to one embodiment of the present disclosure.

Referring now to FIG. 1, there is shown a block diagram for a robot system 10 with an industrial robot 12 which is used to perform work on a workpiece 14. The robot 12 is an automatic machine with 'n' number of degrees of freedom. System 10 can also include a vision sensor 11, a computation device 13 and a robot controller 15. The vision sensor 11 and computation device 13 can be in the same housing if sensor 11 is a smart sensor. The program to operate the industrial robot is in robot controller 15.

Figure 2A:
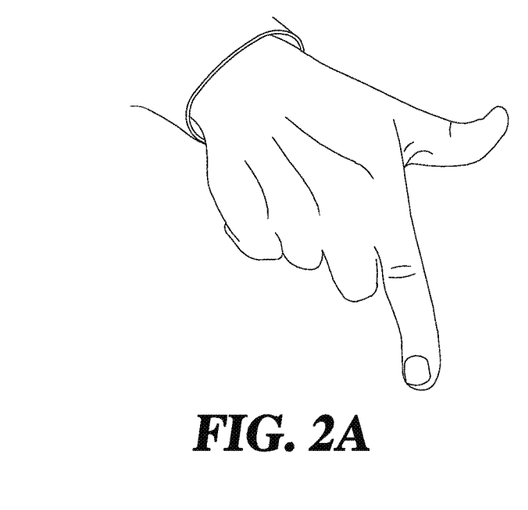
FIGS. 2A-2C illustrate three examples of hand gestures to record positions in a work cell for robot path programming as well as operations for the robot to perform during program execution according to one embodiment of the present disclosure.
Figure 2B:
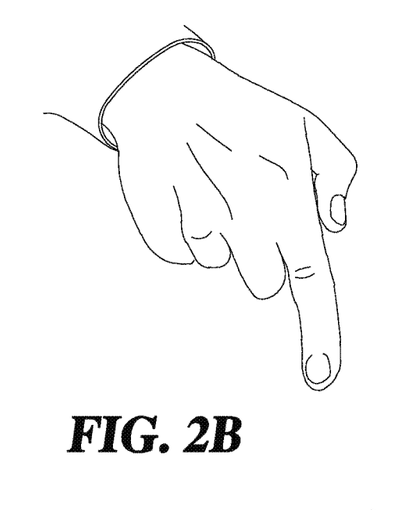
Figure 2C:
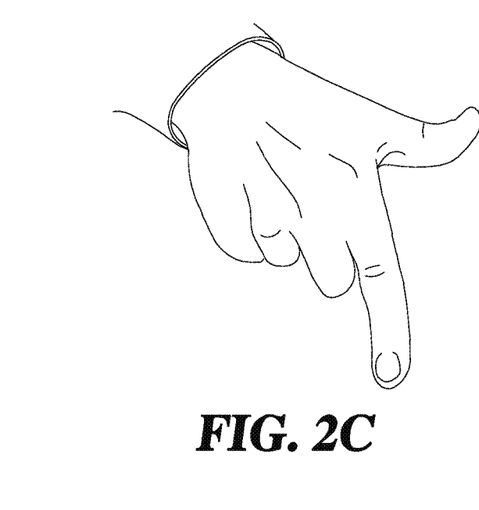

FIGS. 2A, 2B and 2C show examples of hand gestures that may be used to record positions in a work cell for robot path programming as well as operations for the robot to perform during program execution. These exemplary gestures can be used to teach a point on an object or workpiece that the robot will perform work on and/or to follow a path to perform that work. The gesture illustrated in FIG. 2A can be used to start the teaching, the gesture in FIG. 2B can be used to continue the teaching and the gesture in FIG. 2C can be used to stop the teaching.

In the exemplary embodiment, the start gesture and the stop gesture are the same gesture; however, it should be appreciated that the robot can be programmed to "understand" the context in which the two instructions are used. For the start and stop instructions, the start instruction is generated first. Thus the first time that this hand gesture is used it will be interpreted to mean the start instruction and the second time the hand gesture is used it will be interpreted to mean the stop instruction.

Figure 2D:
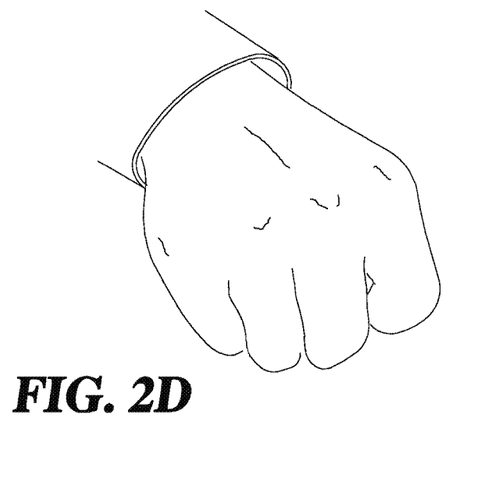
FIGS. 2D-2E illustrates two examples of gestures for picking up and dropping a work object.
Figure 2E:
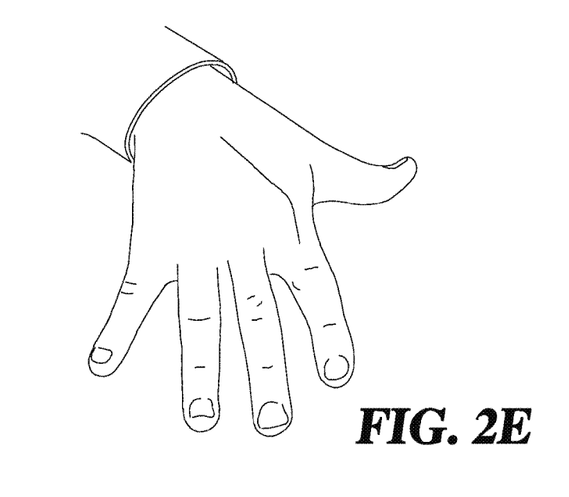

FIGS. 2D and 2E show two examples of gestures for picking up and dropping a work object respectively. These gestures can be used in combination with teaching the robot a point or to follow a path and the gestures can be taught by one hand or both hands.

Figure 3:
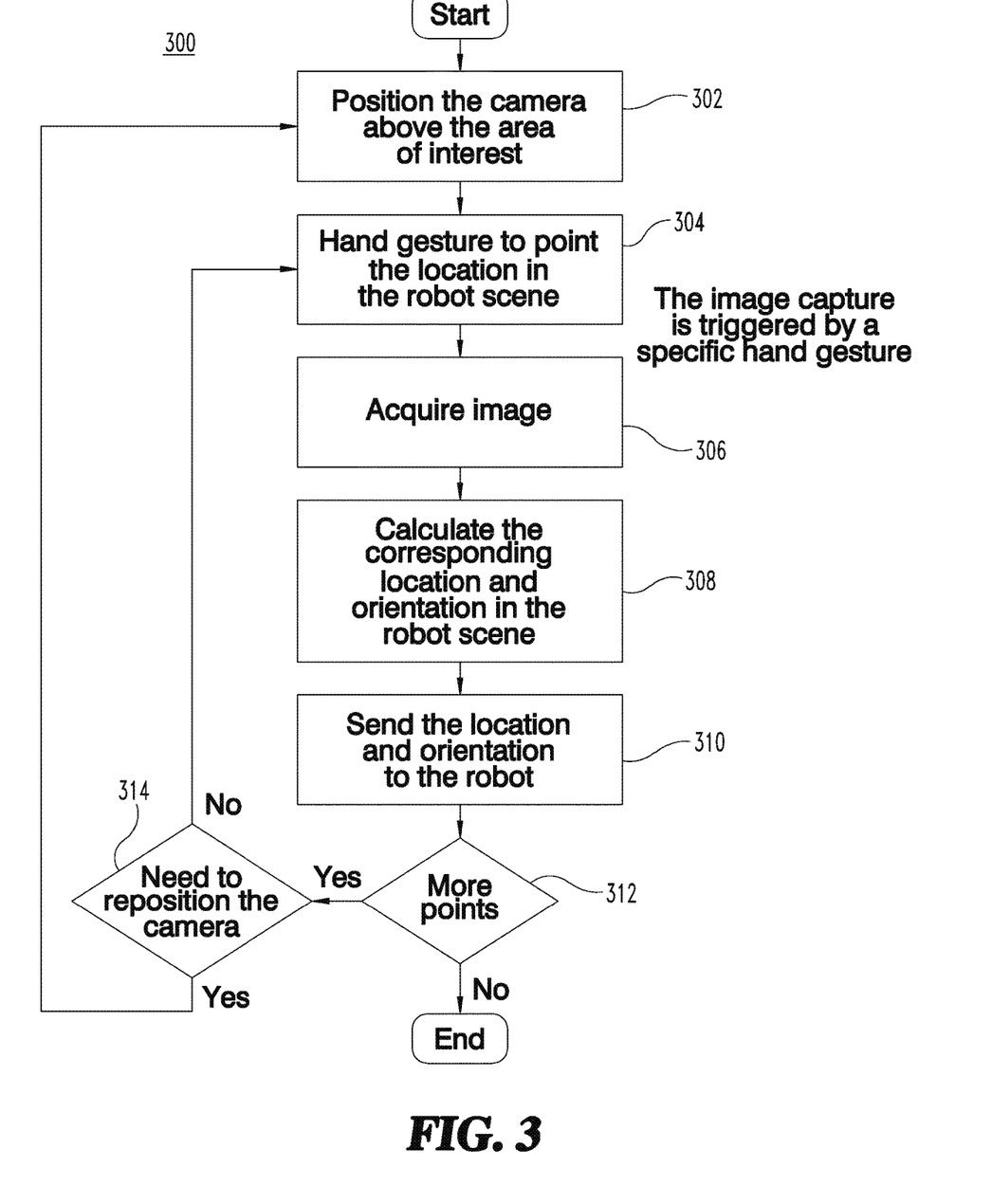
FIG. 3 is a flowchart illustrating one example of a method that uses hand gestures to program a path that will be followed by an industrial robot when work is performed on an object.

Referring now to FIG. 3, there is shown a flowchart for a method 300 that uses hand gestures to program a path to be followed by an industrial robot when work is performed on an object. At step 302 the operator positions the camera that is attached to the robot above the area of interest. At step 304 a hand gesture is made by the operator to point to a location in the robot scene. For example, if this location is the start point the operator can use the gesture shown in FIG. 2A if that gesture has previously been associated with the start instruction to teach that robot target. As should be appreciated, if the robot has to grab an object at that location, then another hand gesture such as that shown in FIG. 2D can be used to teach that function.

At step 306, the image of the location pointing hand gesture of step 304 and the associated location on the object are captured by the camera 11 and sent to the computation device 13 for processing. The image captured by the camera can be triggered by a defined hand gesture. At step 308, the computation device 13 calculates from the image the corresponding location and orientation of the robot tool in the robot scene.

While not shown in flowchart 300, after positioning the camera in step 302, an optional step of acquiring an image of the robot scene without using an operator's hand gesture can be performed in certain embodiments. If the image of the robot scene without the operator's hand has occurred in flowchart 300, then at step 308 the corresponding location and orientation of the robot tool in the robot scene can be calculated by subtracting the hand acquired in step 306. In another form, an optional 3D model of the operator's hand may be used at step 308. The model can be used to identify the gesture and calculate the gesture information including geometry and other properties such as deviation from a nominal position. By definition, the optional steps may not be necessary to the image with the hand acquired in step 306 is processed so as to remove the hand without using an image that shows the hand or a 3D model of the hand.

In step 308, the hand and finger location and orientation can be used to calculate the corresponding location and orientation of the robot tool in the robot scene. One way to calculate the robot target is to intersect the finger direction with the scene data. This can be done by having an image of the scene or a CAD created view of the scene. It is understood that both gesture image and scene image (or CAD) are referenced in the same coordinate system and if not they can be transformed to a common coordinate system.

At step 310 the calculated location and orientation of the robot tool are sent to the computation device. Query 312 asks if more location points are needed to complete the robot path. Query 312 can be defined by another gesture. If the answer is yes, the method 300 determines at query 314 whether there is a need to reposition the camera. If the answer to query 314 is no, then the method 300 returns to step 304 where the operator makes the hand gesture associated with the next location point. If the answer to query 314 is yes, then the method 300 returns to step 302 where the camera is repositioned. If the answer to query 312 is no, then method 300 ends as no more robot path points have to be acquired.

While not shown in FIG. 3, the function performed by step 310 can be replaced with one of storage of the location and orientation information. If the answer to query 312 is that no more points have to be taught, then the taught points can be sent to the robot. More details on how 3D vision can be used with hand gestures for robot path programming and the operations for the robot to perform during program execution are described in published International Application WO2014093822 and is incorporated herein by reference.

In some embodiments of the present disclosure, a "dummy tool" may be used to train the robot. Using a dummy tool to teach a pathway and/or work operations for a workpiece will give the user or operator an indication of potential collisions between the tool and the work objects and other objects in the work cell during the teaching or training without potentially causing damage to a real or actual tool during the path programming. Feedback related to interference or potential collisions from using the dummy tool may or may not be 100% accurate depending on how close the dimensions of the dummy tool are to that of the real or actual tool. Therefore after programming the robot with a dummy tool a real simulation of the path may be performed with the real tool to determine if there will be any collisions between the real tool and the work object or other objects in the work cell during live or actual operation.

Figure 4:
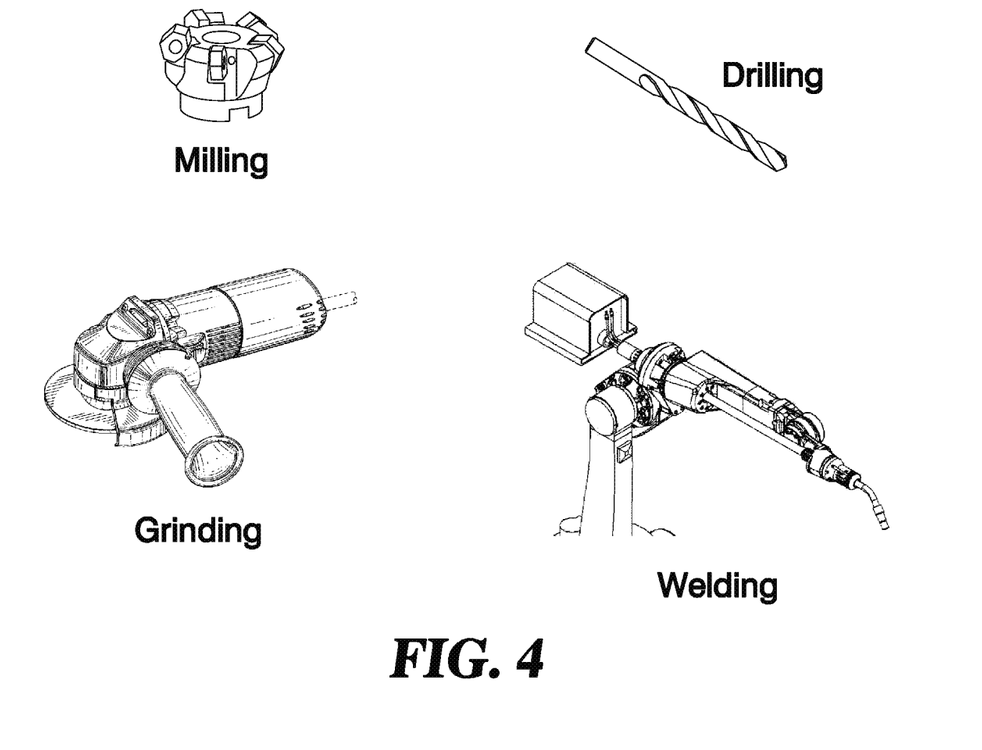
FIG. 4 depicts some exemplary forms of robot tools.
Figure 5:
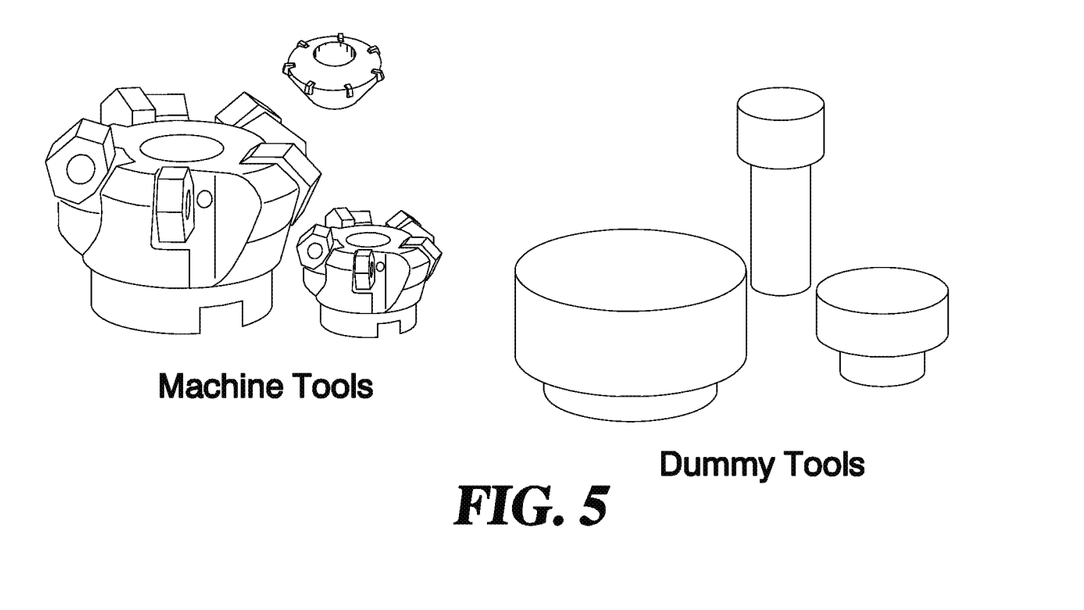
FIG. 5 shows examples of real milling tools and their corresponding dummy tool designs.

As shown in FIG. 4, robot tooling can come in various shapes and sizes. By way of example and not limitation, robot tooling can include a milling tool, a drilling tool, a grinding tool and a welding tool. Teaching path positions without an accurate representation of a tool's shape and size can sometimes lead to teaching points that will cause collisions when the robot executes the program during live operation. However, using the actual tool to teach points may be undesirably for many reasons. For example the actual tool may be extremely heavy or may have dangerous features such as sharp edges or the like. A dummy tool with substantially the same geometry as the real tool can be used to teach path positions using much of the same technology as the bare handed teaching techniques with an actual tool. FIG. 5 shows examples of real milling tools and their corresponding dummy tool designs. A depiction of actual milling tools along with corresponding dummy tools are shown to provide a visible example of potential differences.

In some instances a dummy tool can be connected to the robot during certain training operations and in other instances the dummy tool can be held, moved, manipulated by an "operator" or "user" during certain training operations. The manipulation can include procedures to change a configuration state of the dummy tool such as opening or closing a gripper and the like. The dummy tool can be used to teach and program the robot with a 3D vision system. In some embodiments, one or more cameras associated with a 3D vision system can be used to track the position, orientation and state of operating configuration of the dummy tool during the training procedure. The 3D vision system can then transmit the tracking data to a computational device so as to determine a desired operating pathway and other instructional commands for the robot to follow during actual operation.

Although not shown, other examples of the dummy tools may include a gripper, spot welder or any other type of robot tooling. One desired feature of such dummy tools is that their shape and size substantially matches the real tool so that the path programmer has an accurate and intuitive understanding of possible collision issues and the tool's proper orientation in the context of its use in the real work cell. It is not necessary for the dummy tool used in path teaching to replicate the real tool in its entirety. In some forms the dummy tool may replicate only part of the real tool especially those parts of the real tool that will be in contact with the object when the real tool performs work on the object. However, even if only a part of the dummy tool is used to teach the robot, the entire 3D model of the dummy tool may be used by the system to check for collision or calculate accurate robot paths in simulation.

In some cases, there is one correct orientation of a tool which can be determined automatically from other geometric information readily available, such as calculating the correct welding angle from the known orientations of the surfaces being welded (e.g. the surfaces of a corner weld). In other cases, there may be more than one valid orientation of the tool and in such cases the orientation of the dummy tool can be used to determine the preferred orientation to generate the robot path.

Figure 6:
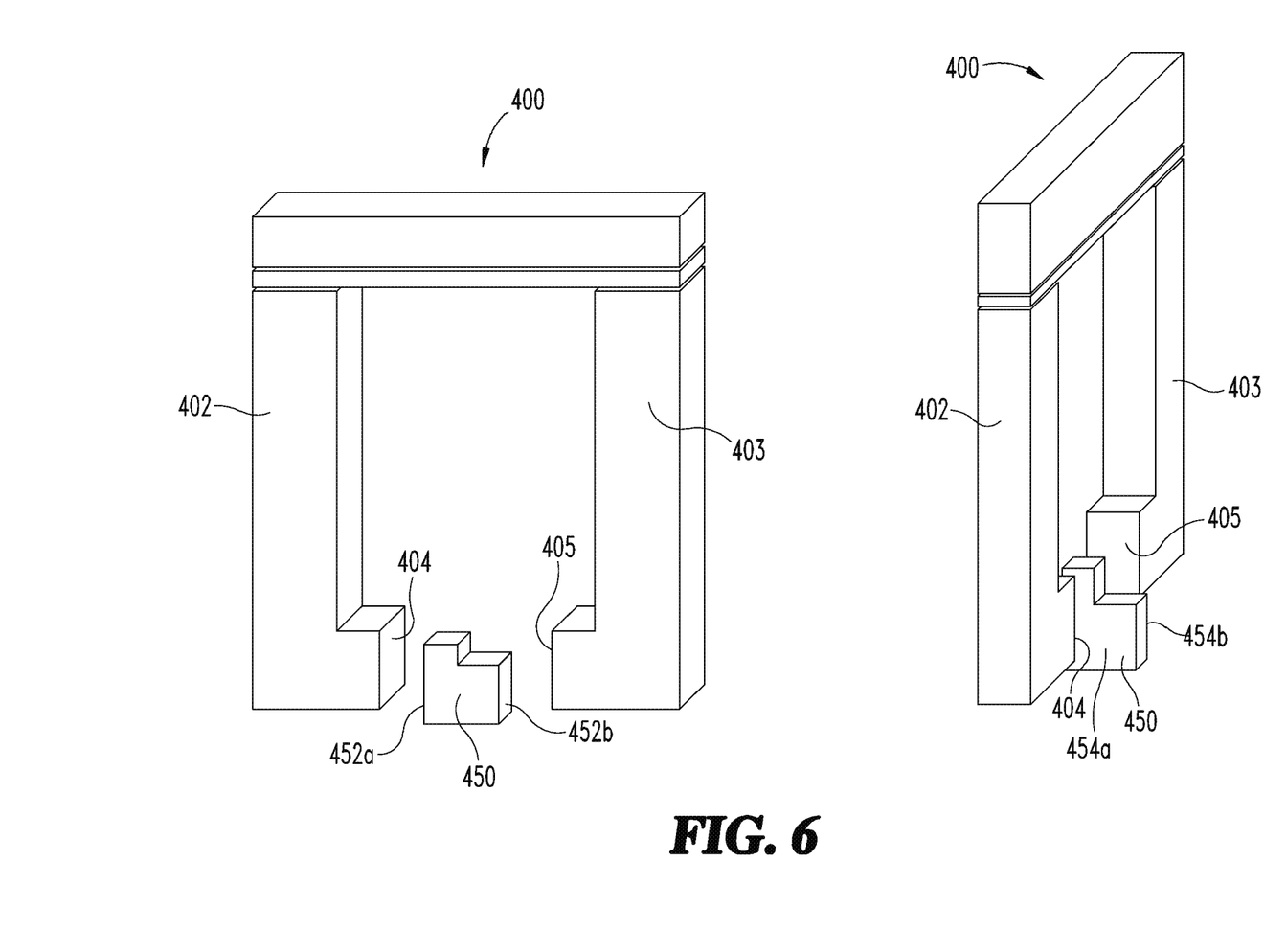
FIG. 6 shows an example of a two fingered gripper that can grip a part in alternate positions.

FIG. 6 shows an example of a two fingered gripper 400 that can grip a part of workpiece 450 in more than one way. The gripper 400 may include first and second arms 402 and 403 that can be movable relative to one another in certain dummy tool configurations. The first and second movable arms 402 and 403 can include gripping surfaces 404 and 405 that are configured to contact the workpiece 450 and perform tasks such as holding, manipulating or repositioning as required by the programmed robot. The workpiece 450 can include a first set of opposing sides 452a and 452b that are engageable with the gripping arms surfaces 404 and 405 respectively. In some forms the workpiece 450 may be engaged by the gripper 400 at a different orientation such as by opposing sides 454a and 454b of the workpiece 450. Using this tool an operator can intuitively, accurately and unambiguously teach the preferred gripping position and orientation of the tool position relative to a workpiece 450. In addition to the teaching a preferred gripping orientation, the use of a dummy tool can also improve the accuracy of 3D vision based point teaching because the dummy tool has a known geometry which the 3D vision system can use for pattern matching and error correction in the vision data.

In some forms only the rough positioning of the dummy tool is necessary. This method can be the same as that of using only a bare hand technique. In this case, the position of the dummy tool is calculated from the interaction between the gesture and scene model. In other forms an exact positioning of the dummy tool is used to extract the robot path and an accurate position of the dummy tool. In some forms a known 3D model of the dummy tool can be used. In such cases the dummy tool is defined with a specific configuration, then a pointer or a feature of interest on the dummy tool can be used along with the tool's 3D model to recognize, track and accurately determine the position of the tool. A dummy tool can be used to teach positions and orientations of the robot. In some forms, hand gestures can be used along with the dummy tool to indicate operations, such as turning a saw on or off, picking up a part, etc.

In some forms haptic feedback can be included with a system using a dummy tool to indicate error states and/or other conditions of interest. An error state or invalid command can be defined by, for example, a request to move the robot tool to an unreachable location, a prohibited location, or an interference condition. For example, when the user tries to teach a point that is not actually reachable by the robot, a small vibration and/or audible noise can be used to notify the user that commanded location is invalid. In other examples, haptic feedback can be transmitted to indicate that the dummy tool is near or crossing a boundary of certain zones (e.g. safety zones). Sometimes the haptic feedback may be transmitted to a control panel or control device such as a joystick or the like. Other forms of haptic feedback may include an audible sound to alert an operator that an issue relating to the dummy tool needs to be addressed.

Figure 7:
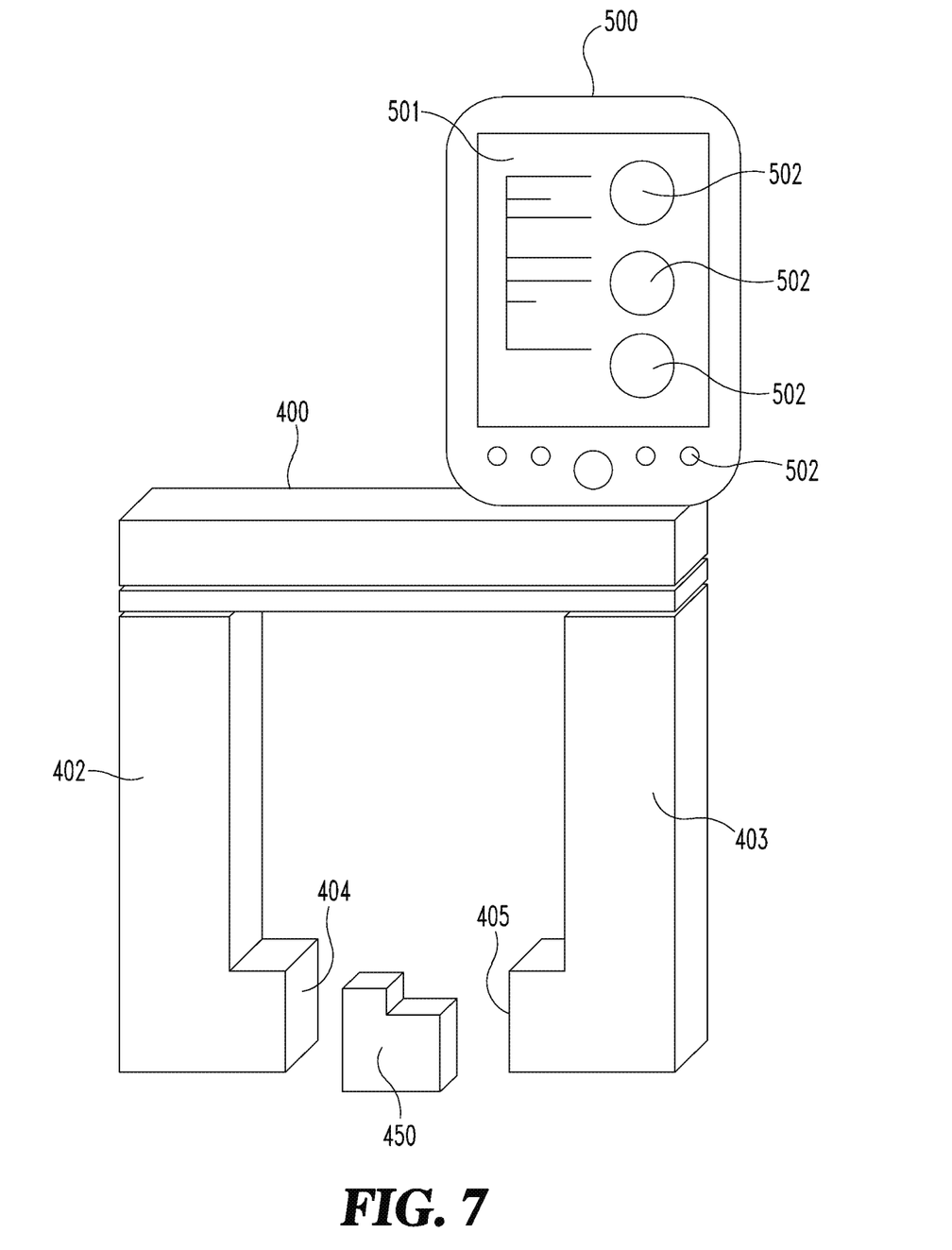
FIG. 7 shows a dummy tool with a detachable GUI.

Referring now to FIG. 7, an input/output (I/O) device 500 can be removably attachable to a dummy tool 400. The I/O device may include a GUI 501 (e.g. a graphical user interface such as a custom touch screen input device). In some forms the I/O device 500 can include "smart" devices such as a mobile phone or a tablet. The I/O device 500 device can be attached to a dummy tool such as a gripper 400 to provide additional functionality thereto. The I/O device 500 may be used to provide command options such as the ability to record position, modify position, delete position, open gripper, close gripper, control I/O display, etc. In some embodiments, the I/O device 500 may communicate with the robot controller wirelessly and in other embodiments a direct wire connection may be employed. In some forms the I/O device 500 may be dedicated to a particular dummy tool and in other forms the I/O device 500 may be attached and detached to and from any number of dummy tools. The user of the I/O device 500 can provide input commands including, by way of example and not limitation, a tap, swipe, or other interaction with an icon shown in the GUI 501. The I/O device 500 may determine whether a touch input has been detected and signal a confirming response. As shown in FIG. 7 the I/O device 500 can have one or more buttons 502 for dedicated commands. The I/O device 500 may be used to edit robot program data in response to touch interaction with standard user interface elements such as with the buttons 502 or virtual keyboards and the like. After inputting a command, the I/O device 500 may transmit the updated robot program data to the robot controller.

Figure 8:
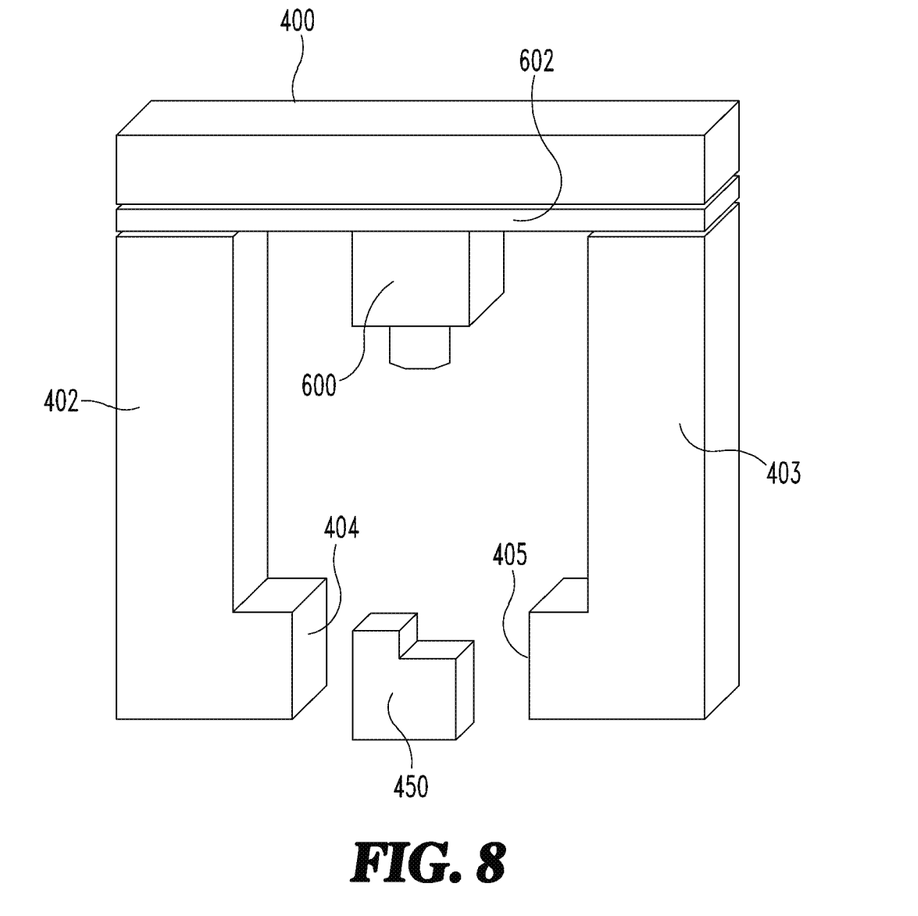
FIG. 8 shows a dummy tool with an attached camera.

Referring now to FIG. 8, an exemplary dummy tool 400 can include an attached camera 600 in certain embodiments. The camera 600 can be used to track the relationship of the dummy tool 400 to objects in the work area. In certain positions an object may be occluded from the camera's view. To alleviate the occlusion, some forms of the dummy tool 400 and camera 600 combination may include movable coupling means. In one aspect the camera 600 may be manually repositioned by a user via attachment means as would be known to those skilled in the art. In other forms the camera 600 may include a motorized track 602 that permits electronic control of the position of the camera with respect the dummy tool 400. In some forms the movement of the camera 600 is possible while the robot is in an operating mode such as moving along a pathway or performing (or simulating) work on a workpiece. The camera 600 can be used to view or otherwise detect an object and determine the absolute location or the relative position of the dummy tool and the object in a defined coordinate system. The position of the object may be used in the path planning. In some forms the camera 600 on the dummy tool 400 may also be used with the actual robot tool. In other forms the actual tool may not have an attached camera or may have a different camera from that of the dummy tool 400. Furthermore, the camera 600 used with the dummy tool and/or the actual tool may be different from the camera used to track the gesture commands. For example, the tool camera could be a high resolution 2D camera that is capable of 2D pattern matching, while the camera used to capture the hand gestures may be a 3D camera.

In one aspect, the present disclosure includes a system comprising: a robot configured to perform an operation on a workpiece; a 3D vision system operable for tracking objects; a dummy tool configured to represent at least a portion of an actual tool used during operation of the robot; a database for storing robot commands defined by hand gestures; a 3D model of a robot scene; and a computational device configured to define an operation path and operation commands for the robot to follow based on input from the training procedure including data captured by the 3D vision system of one or more positions and orientations of the dummy tool, hand gestures and the 3D model of a robot scene.

In refining aspects, the present disclosure includes a system wherein the hand gestures are operable to provide instructions to the robot; wherein the operation on the workpiece includes at least one of grinding, milling, drilling, welding or maneuvering; comprising a camera connected to the dummy tool; wherein the camera is operable for transmitting discrete pictures and/or a continuous video stream during the training procedure to the computational device; comprising a coupling constructed to permit movement of the camera with respect to the dummy tool during operation of the robot; comprising a I/O device connectable to the dummy tool; wherein the I/O device is operable for transmitting commands or receiving data to/from the computational device; wherein the commands to the I/O device include at least one recording a position, modifying a position and changing a configuration state of the dummy tool; comprising a haptic feedback mechanism operable for generating haptic feedback when the robot encounters an obstacle or receives an invalid command during the training procedure.

In another aspect, the present disclosure includes a robot system comprising: a programmable robot; a sensor for sensing input commands from a hand gesture; a 3D camera operable to provide a 3D robot scene; a dummy tool configured to replicate at least a portion of an actual tool; wherein a pathway and operational movement of the robot is defined by instructions from a computational device based on results from a training procedure that uses the robot and the dummy tool.

In refining aspects, the present disclosure includes a robot system comprising means for providing haptic feedback to an operator upon an occurrence of predefined criteria; wherein the predefined criteria includes one of an error state or invalid command; wherein the haptic feedback includes one of a vibratory output and an audible sound; further comprising a camera positioned on the dummy tool; wherein the camera is a 2D camera; wherein the camera is connected to the dummy tool via a movable coupling; wherein the camera is movable with respect to the dummy tool while the robot is moving and/or performing operations on the workpiece; further comprising a detachable I/O device connected to the dummy tool; wherein an operator holds and moves the dummy tool by hand during at least a portion of the training procedure; wherein the robot holds and moves the dummy tool during at least a portion of the training procedure.

In another aspect, the present disclosure includes a method comprising: providing a dummy tool for operation with a robot; training the robot to move along a workpath and/or work on a workpiece using the dummy tool to determine a potential interference with an object along the workpath; and inputting commands to a computational device to define the workpath and/or operational maneuvering of the robot with an actual tool based on the training.

In refining aspects, the present disclosure includes a method wherein the training further comprises using hand gestures for command input; wherein the training further comprises transmitting haptic feedback when the robot encounters and error state or an invalid command; wherein the training further comprises attaching a camera to the dummy tool and transmitting video images to the computational device; wherein the attaching includes a movable coupling operable for attaching the camera to the dummy tool such that the camera is movable relative to the dummy tool when the robot is working on a workpiece; further comprising teaching the robot to engage a workpiece in a preferred location with the dummy tool; wherein the training further comprises holding, moving, manipulating and changing a configuration state of the dummy tool with a hand of an operator; wherein the training further comprises holding, moving, manipulating and changing a configuration state of the dummy tool with the robot.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system comprising:
   a 3D vision system operable for tracking objects;
   a dummy tool configured to represent at least a portion of an actual tool used during operation of a robot;
   a 3D model of a robot scene; and
   a computational device configured to define an operation path and operation commands for the robot to follow based on input from a training procedure including data captured by the 3D vision system of one or more positions and orientations of the dummy tool and the 3D model of a robot scene.

2. The system of claim 1, which further includes a database for storing robot commands defined by hand gestures, and wherein the computational device is further configured to define the operation path and operation commands for a robot to follow based on hand gestures.

3. The system of claim 2, which further includes the robot configured to perform an operation on a workpiece.

4. The system of claim 3, wherein the hand gestures are operable to provide instructions to the robot.

5. The system of claim 3, wherein the robot is a mobile robot, and which further includes an I/O device connectable to the dummy tool, and wherein the I/O device is operable for transmitting commands or receiving data to/from the computational device.

6. The system of claim 5, wherein the commands to the I/O device include at least one recording a position, modifying a position and changing a configuration state of the dummy tool.

7. The system of claim 2, wherein the operation on the workpiece includes at least one of grinding, milling, drilling, welding or maneuvering.

8. The system of claim 2, further comprising a haptic feedback mechanism operable for generating haptic feedback when the robot encounters an obstacle or receives an invalid command during the training procedure.

9. The system of claim 8, wherein the haptic feedback includes one of a vibratory output and an audible sound.

10. The system of claim 8, wherein the haptic feedback mechanism is activated to indicate an error state.

11. A system comprising:
    a 3D camera operable to provide a 3D robot scene;
    a dummy tool configured to replicate at least a portion of an actual tool;
    wherein a pathway and operational movement of a robot is defined by instructions from a computational device based on results from a training procedure that uses data from the 3D camera related to the dummy tool.

12. The system of claim 11, which further includes a sensor for sensing input commands from a hand gesture.

13. The system of claim 12, which further includes the robot and a database for storing robot commands defined by hand gestures.

14. The system of claim 13, wherein the robot is mobile, and wherein the database includes a query command defined by a query hand gesture, the query command structured to determine whether additional location points are required to complete the pathway and operational movement of the robot.

15. The system of claim 11, further comprising means for providing haptic feedback to an operator upon an occurrence of predefined criteria.

16. The system of claim 15, wherein the predefined criteria includes one of an error state or invalid command.

17. The system of claim 16, wherein an operator holds and moves the dummy tool by hand during at least a portion of the training procedure, and wherein the haptic feedback includes one of a vibratory output and an audible sound.

18. The system of claim 11, further comprising a camera connected to the dummy tool, wherein the camera is operable for transmitting discrete pictures and/or a continuous video stream during the training procedure to the computational device.

19. The system of claim 18, further comprising a coupling constructed to permit movement of the camera with respect to the dummy tool during operation of the robot.

20. The system of claim 19, which further includes a sensor for sensing input commands from a hand gesture, which further includes a programmable robot, and which further includes a database for storing robot commands defined by hand gestures, and wherein the robot is mobile.

21. A method comprising:
manipulating a dummy tool structured to mimic an actual tool;
capturing an image of the dummy tool using a 3D vision system;
training a robot system to form robot commands useful to move a robot along a workpath and/or work on a workpiece using the dummy tool to determine a potential interference with an object along the workpath.

22. The method of claim 21, wherein the training includes utilizing a 3D vision system to provide the robot with a vision scene which it uses to detect the dummy tool.

23. The method of claim 22, which further includes inputting commands to a computational device to define the workpath and/or operational maneuvering of the robot with the actual tool based on the training.

24. The method of claim 22, wherein the training further comprises using hand gestures for command input.

25. The method of claim 24, wherein the training further comprises transmitting haptic feedback when the robot encounters and error state or an invalid command.

26. The method of claim 25, wherein the training further comprises attaching a camera to the dummy tool and transmitting video images to the computational device.

27. The method of claim 24, which further includes capturing data related to an operation configuration of the dummy tool.

28. The method of claim 24, which further includes simulating a robot path defined as a result of the training to check for collision or calculate accurate robot paths.

* * * * *